(12) United States Patent
Pike et al.

(10) Patent No.: US 8,402,150 B1
(45) Date of Patent: Mar. 19, 2013

(54) MANIPULATION OF LONWORKS® PROTOCOL FOR RF COMMUNICATIONS

(75) Inventors: Bryan Pike, Sylvester, GA (US); Joseph Dylinski, Sylvester, GA (US); Zane Brown, Americus, GA (US)

(73) Assignee: Automated Irrigation Controls, LLC, Sylvester, GA (US)

( * ) Notice: Subject to any disclaimer, the term of this patent is extended or adjusted under 35 U.S.C. 154(b) by 874 days.

(21) Appl. No.: 11/878,992

(22) Filed: Jul. 30, 2007

Related U.S. Application Data

(60) Provisional application No. 60/834,471, filed on Jul. 31, 2006.

(51) Int. Cl.
*G06F 15/16* (2006.01)

(52) U.S. Cl. ........................................ 709/230; 370/311

(58) Field of Classification Search ................ 709/230
See application file for complete search history.

(56) References Cited

U.S. PATENT DOCUMENTS

| | | | |
|---|---|---|---|
| 6,151,646 A | 11/2000 | Watts | |
| 6,295,566 B1 | 9/2001 | Stufflebeam | |
| 6,388,399 B1 | 5/2002 | Eckel | |
| 6,643,566 B1 | 11/2003 | Lehr | |
| 6,731,201 B1 | 5/2004 | Bailey | |
| 6,779,004 B1 | 8/2004 | Zintel | |
| 6,792,323 B2 | 9/2004 | Krzyzanowski | |
| 6,798,341 B1 | 9/2004 | Eckel | |
| 6,820,049 B1 | 11/2004 | Monroe | |
| 6,892,230 B1 | 5/2005 | Gu | |
| 6,909,943 B2 | 6/2005 | Lehr | |
| 6,922,558 B2 | 7/2005 | Delp | |
| 6,940,814 B1 | 9/2005 | Hoffman | |
| 7,085,814 B1 | 8/2006 | Gandhi | |
| 7,089,066 B2 | 8/2006 | Hesse | |
| 7,164,956 B2 | 1/2007 | Bicknell | |
| 2002/0016639 A1 | 2/2002 | Smith | |
| 2002/0035621 A1 | 3/2002 | Zintel | |
| 2002/0152298 A1 | 10/2002 | Kikta | |
| 2003/0212821 A1 | 11/2003 | Gillies | |
| 2004/0015620 A1 | 1/2004 | Brown | |
| 2004/0133704 A1 | 7/2004 | Krzyzanowski | |
| 2005/0044275 A1 | 2/2005 | Adamson | |
| 2005/0058073 A1 | 3/2005 | Ayyagari | |
| 2005/0097478 A1 | 5/2005 | Killian | |
| 2005/0172056 A1 | 8/2005 | Ahn | |
| 2005/0216302 A1 | 9/2005 | Raji | |
| 2005/0267935 A1 | 12/2005 | Gandhi | |
| 2006/0029087 A1 | 2/2006 | Ooi | |
| 2006/0053447 A1 | 3/2006 | Krzyzanowski | |
| 2006/0059287 A1 | 3/2006 | Rivard | |
| 2006/0129700 A1 | 6/2006 | Bopardikar | |
| 2006/0187866 A1* | 8/2006 | Werb et al. ................ 370/311 |
| 2006/0212175 A1* | 9/2006 | Kim et al. ................ 700/277 |

OTHER PUBLICATIONS

CL4790, Users Manual Version 1.0. Aerocomm. Jun. 24, 2005.*
"Open System Design Guide—Designing Open Building Control Systems Based on LonWorks® Technology", Version 2.0, Echelon Corporation, 15 pages.
"LonWorks", http://en.wikipedia.org/wiki/lonworks, Oct. 29, 2008, 3 pages.
"FT 3120/FT 3150 Free Topology Smart Transceivers", http://www.echelon.com/products/transceivers/ft/ftsmart.htm, Oct. 29, 2008, 3 pages.

(Continued)

*Primary Examiner* — Wing F Chan
*Assistant Examiner* — David X Yi
(74) *Attorney, Agent, or Firm* — Dowell & Dowell, PC

(57) ABSTRACT

A method and system for converting LonWorks® protocol in an electrical device management network to a different protocol for RF transmission between RF transceivers of the network and thereafter returning the converted protocol back to the LonWorks® protocol at a remote location without the need for software to make the conversions.

11 Claims, 3 Drawing Sheets

OTHER PUBLICATIONS

"Resources LonWorks", Intellicon Innovation, http://www.netbiter.com/res_lonworks.shtml, Oct. 29, 2008, 2 pages.
"LonWorks", LonWorks Protocol, http://www.fieldserver.com/about/LonWorks.asp, Jul. 15, 2007, 1 page.
"NES: The Power Behind Smart Meeting", Echelon, http://www.echelon.com/metering/default.htm, Jul. 15, 2007, 2 pages.
"LonWorks Product Catalog", http://www.echelon.com/productDB/productdetail.asp?prodID=1519&manID=126, Jul. 15, 2007, 1 page.
"What's a Transceiver?", http://echelon.com/products/transceivers/basics.htm, Jul. 15, 2007, 1 page.
"The LonWorks Platform: Technology Overview", Echelon, http://www.echelon.com/developers/lonworks/default.htm, Jul. 14, 2007, 2 pages.
"Icelan™ 2000 Product Overview", Iec Intelligent Technologies, 1 page.
"Open Systems Overview", Echelon, http://www.echelon.com/soultions/opensystems/default.htm, Jul. 16, 2007, 1 page.
"LonWorks for Facilty Management", Control Solutions, Inc. Minnesota, http://www.csimn.com/CSI_pages/LonWorks.html, Jul. 15, 2007, 2 pages.
"DTI Lonworks to serial bridge", http://www.dti-be.com/lon/en/dlonbridge.htm, 1 page.
"LonWorks Frequently Asked Questions", Echelon, http://www.echelon.com/developers/lonworks/faq.htm, Jul. 16, 2007, 5 pages.

* cited by examiner

MANIPULATION OF LONWORKS® PROTOCOL FOR RF COMMUNICATIONS

CROSS REFERENCE TO RELATED APPLICATIONS

This application claims the benefit of U.S. Provisional Application for Patent, Ser. No. 60/834,471, filed Jul. 31, 2006, the entire contents of which are incorporated herein by reference.

BACKGROUND OF THE INVENTION

Field of the Invention

This application is generally directed to the field of LonWorks® seamless networking platforms used to monitor and control numerous computers, switches, electronic sensors, monitors and controllers for use with HVAC equipment, appliances, lighting, sprinkler and irrigation systems, power meters, valves, security systems, vending machines, office and industrial machinery, and the like used both in commercial buildings and private environments, wherein control logic is spread across an entire system or network without requiring separate controllers for separate devices or nodes of the network. More particularly, the invention is directed to the field of LonWorks® communication and control systems wherein the LonWorks® signals are converted to permit radio frequency (RF) transmissions in applications where hardwire connections are impractical or where communications must be made across extended ranges.

BRIEF DESCRIPTION OF THE RELATED ART

There is an ever growing movement to provide open communication systems that monitor, report, sense and control the functioning of electrical equipment such as HVAC equipment, irrigation system, lighting, appliances, switches, fans, valves, meters and the like over media including powerlines, optical fibers, twisted wires, coaxial cables, infrared (IR) and radio frequency (RF) transmissions. Such systems make it possible to optimize equipment operating parameters in order to maximize energy efficiencies in homes, apartments, hospitals, schools, places of business and in industrial and transportation industries. As opposed to prior art "master/slave" hierarchy communications between primary or central controllers and remote nodes or devices that are connected to the various monitors, switches, sensors and secondary controllers, in an open network, communication is open and peer-to-peer wherein each node or sets of nodes or devices may communicate with other nodes or sets of nodes using a common protocol, that is transmitted over any one of a plurality of different media. A universally recognized open network protocol to implement such communications was developed by Echelon® and is known as LonWorks®. The LonWorks® control networking platforms include a low bandwidth protocol known in the industry as ANSI/EIA709.1, EN14908, IEEE 1593-L and SEMI E56.6. The platforms include nodes or devices having dedicated Neuron® microprocessor chips that have been developed for control networking and which communicate by way of LonWorks® transceivers over various communication media including twisted pair wires, cables, powerlines, fiber optics and radio frequency (RF) with other nodes or devices of a network. Management of the networking platforms is by way of specially developed application software such that control and monitoring of the various nodes or devices may be done remotely, such as over Ethernet.

LonWorks® networks permit communication between as many as 32,000 devices or nodes, each of which is associated with equipment installed on a network including sensors, actuators, alarms and other warning devices, controllers, monitors and the like. Each node includes a 48 Bit identification. The devices or nodes are able to send and receive messages with respect to other devices or nodes on the network without knowing the topology of the network or the identity of the other devices or nodes of the network. The network management software interacts with the devices or nodes to set various identifications and protocol parameters, download specific applications or instructions, require reporting of specific information relating to the condition or operating characteristics of a piece of equipment, a switch, a sensor, a controller or the like, and to cause specific events to occur, such as turning a device ON or OFF, starting a process or machine, terminating power to stop a process or machine, or to change operating parameters such as the operating temperature of a buildings HVAC system by resetting a control thermostat.

For the network devices to communicate with the other devices or nodes of the network and the control or management software, the signals are processed through LonWorks® transceivers such as LonWorks® twisted pair and power line transceivers. One such transceiver is the FTT-10A transceiver that operates at 78 kbps baud rate over a range of about 500 meters. The range can be increase but requires the addition of repeaters. Although RF communication links have been established utilizing LonWorks® protocols, such links have been generally in-line or in-sight communications that require special management software such as Lonmaker® or Workplace Pro®.

In view of the foregoing, it would be a significant benefit to increase the range of RF communication of devices or nodes and management computers in a LonWorks® network without the need for additional management software so as to allow communication between a control site and one or more remotely positioned devices associated with equipment, switches, sensors or controllers located at distances beyond the currently effective ranges of current LonWorks® networks and wherein twisted wire or powerlines applications are not practical.

SUMMARY OF THE INVENTION

The present invention is directed to a bridging and RF modem system for permitting long distance RF communications within a LonWorks® network that includes two or more domains of nodes or devices that are remotely positioned relative to one another. Each device or node or sets of devices or nodes includes a Neuron® processor chip operating on a LonWorks® protocol and wherein the system includes a first set or domain of devices and/or controllers operating at one location that communicates through a first channel to a LonWorks® transceiver which outputs signal packets in the LonWorks® protocol to an input of a plug and play bridge device. The bridge device receives and stores the packets and converts or bundles the signals so as to be compatible for transmission over a serial transport line or device capable of transporting RS-232 signals. The packets that are bundled within the bridge are communicated to an RF transceiver where the signals are stored until the transceiver knows that communication is possible with one or more remote RF transceivers associated with domains or remote groups of controlled devices or nodes of the LonWorks® network. Once the signals are received by the remote RF transceivers they are communicated to another bridge device that converts the RS232 signals to the LonWorks® protocol and from which the signals are transported to LonWorks® transceivers and to the various devices or nodes of the remote domain. Signals from the controlled devices or nodes of the remote domain or domains are transported, converted, transmitted, converted and transported to the devices or nodes of other network domains in a reverse manner. The bridge devices may convert the signals to other communication media including but not limited to RS-422, RS-485 or Ethernet.

It is the primary object of the present invention to provide an RF system for communicating signals in an LonWorks® networking system wherein LonWorks® signal packets are converted for serial transport, such as RS-232 and related signals, prior to RF transmission, and are thereafter, after receipt at a receiving transceiver, reconverted to LonWorks® protocol for communication to devices or nodes within the LonWorks® network without requiring network management software and such that the range of RF transmission may be increased.

BRIEF DESCRIPTION OF THE DRAWINGS

A better understanding of the invention will be had with reference to the accompanying drawings wherein.

DESCRIPTION OF THE PREFERRED EMBODIMENT

Figure 1:
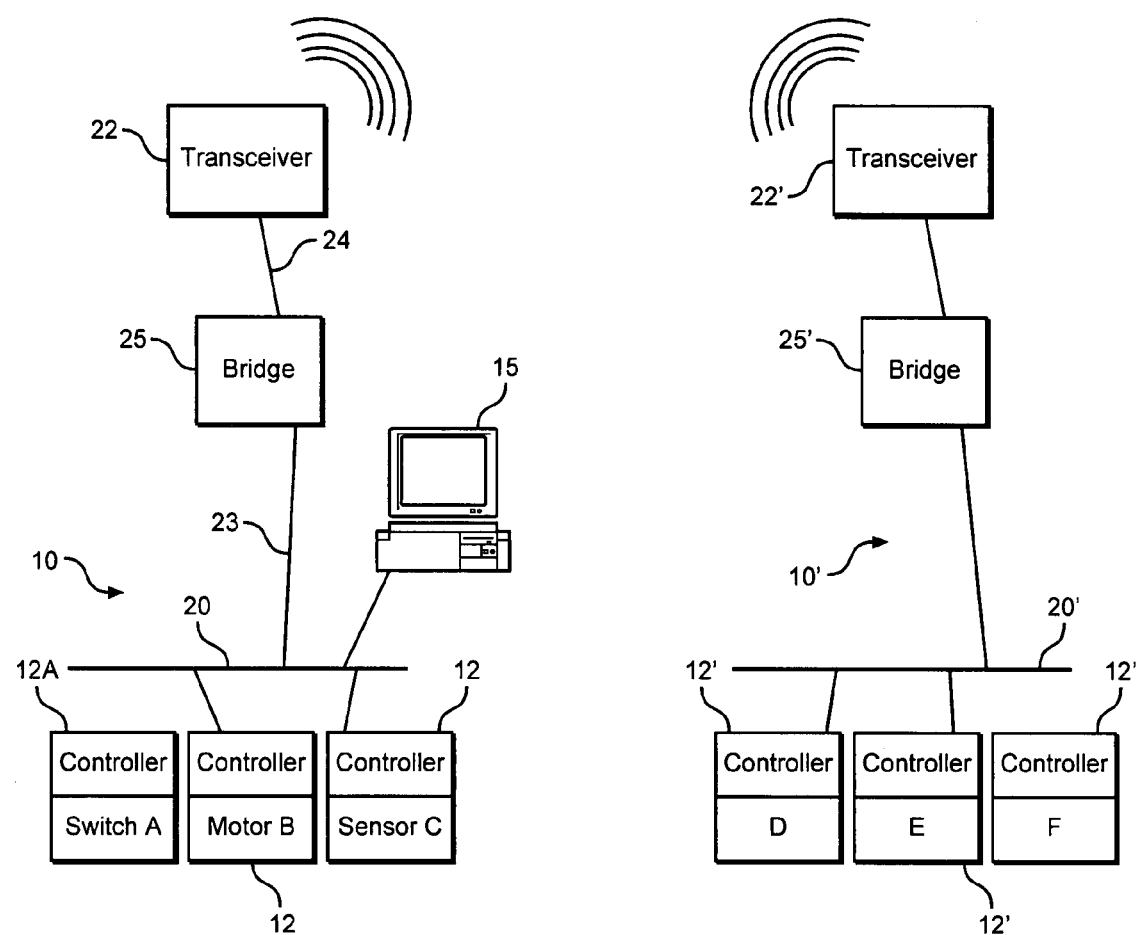
FIG. 1 is a schematic flow chart showing the RF communication System for LonWorks® protocol networking in accordance with the present invention and including a management device that is connected directly to a LonWorks® twisted pair bus to give and receive information and to monitor the functionality of the controllers, sensors and monitors in a LonWorks® network.

With reference to the drawing figures, an RF communication System for LonWorks® protocol networking is disclosed. The network includes a first domain 10 including a plurality of sensing and/or control devices or nodes 12 that are associated with electronic devices, such as a switch A, a motor B, and a sensor C that are to be monitored and/or controlled using various software products that are downloaded within a management computer or processor 15. By way of example, the control devices 12 may be Invensys MN20RS4 controllers. In the diagram of FIG. 1, the computer is a workstation that is located in the area of the first domain. It should be noted that the computer 15 may be located remotely from the network but must be operatively connected thereto by way of routers or other devices.

Figure 2:
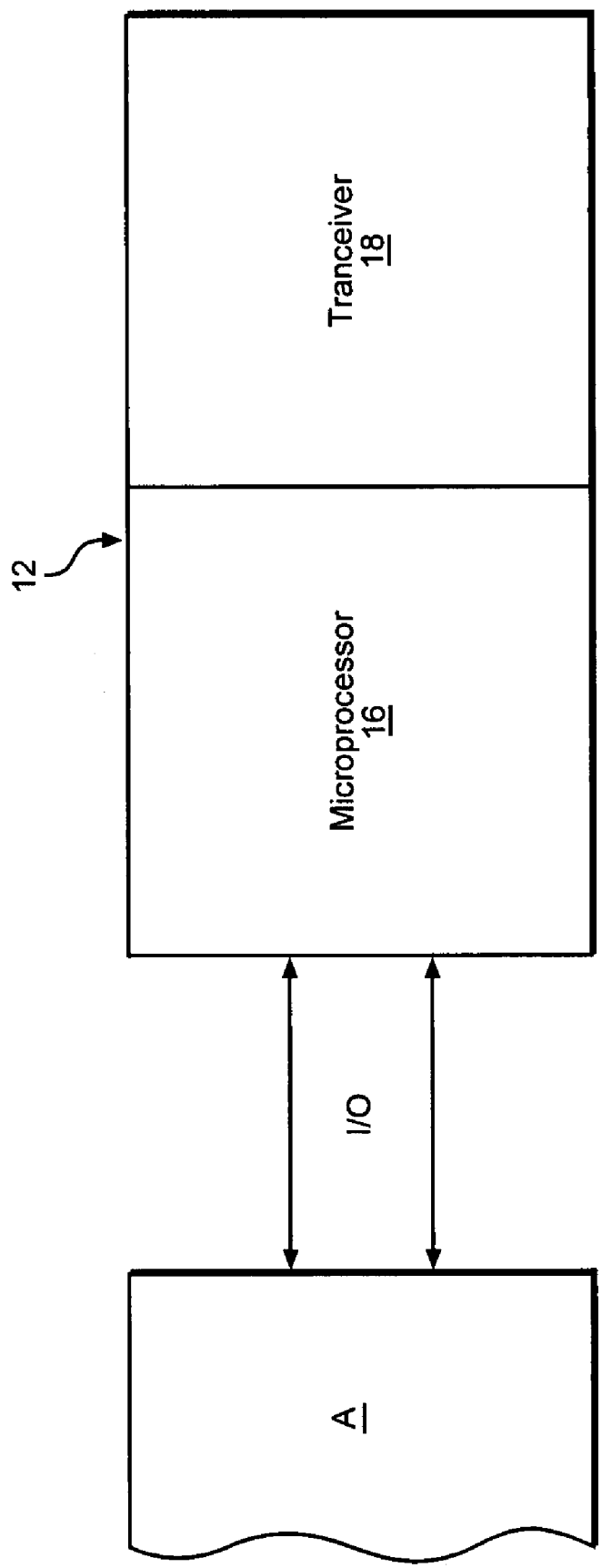
FIG. 2 is a block diagram of one of the controllers, devices or nodes of the invention.

In FIG. 2, the nodes or devices 12 include a microprocessor chip 16, such as a Neuron® chip, that includes a plurality of inline processors such that one or more processors may be used for executing the LonWorks® protocol so as to provide network communication and at least one processor that may be used for specific dedicated tasks that are unique to the controller associated therewith. Each chip may be customized and secured using layering techniques, however, the communication protocol remains compatible with the protocol of other processors of the network. In this manner, devices from separate vendors within the network can link with one another.

With continued reference to FIG. 2, the one or more microprocessors 16 are connected to transceivers 18, such as the twisted wire and power line transceivers developed by Echelon®. In the preferred embodiment of the invention shown, the transceiver 18 is a FTT-10 transceiver operating at 78 kbps baud rate. The signal from the transceiver 18 is transmitted to a twisted wire, coaxial cable or power line bus 20 of the network, as shown in FIG. 1. It should be noted that the devices within the first domain are connected such that they may communicate directly with one another. As shown, controller 12A communicates with the bus using a non-wire Wi-Fi link.

With further reference to FIG. 1, the network includes at least one second domain 10' that is remotely spaced from the first domain by a distance that makes hardwire communication between the domains not practical using a LonWorks® protocol. The second domain also includes a plurality of sensing and/or control devices or nodes 12' that are connected to electrical devices D, E, and F. The nodes include microprocessor chips connected to transceivers as previously described. The control devices 12', the microprocessors and the transceiver are the same as those discussed with respect to the first domain.

In order to communicate the control devices or nodes 12 and 12' of the first and second domains with one another such that information may be exchanged between the processors thereof, the information being communicated must be transmitted by a pair of RF transceivers 22 and 22' associated with the first and second domains, respectively. By way of example, the transceivers may be Aerocomm CL4790-1000-232 transceivers. The transceivers may be selected from, but are not limited to, a variety of 900 MHz, 2.4 GHz, 5.8 GHz and 802.11 transceivers. The transceivers may employ the use of frequency hopping spread spectrum technology, data encryption, addressing and parameter adjustments as needed to increase performance and security.

Before signals in the LonWorks® protocol may be transmitted by the transceivers 22 and 22', the signals must be converted from the LonWorks® protocol to a serial form such as RS-232, although the signals may be converted to RS-422, RS-485 and Ethernet media forms as well. To convert the form of protocol from LonWorks®, a bridge 25, such as a DTI LonWorks® to serial bridge (D-LonbridgeRS), is connected at 23 to the twisted-pair bus receiving the LonWorks® signal from the controllers 12. The bridge is a plug and play module which requires no setup or programming to perform the function of data transfer. The bridge provides transparent packetization and translation of Lonworks® data when the data is being passed from a LonWorks® twisted-pair bus to other media and from other media, using LonWorks® communication, to the LonWorks® twisted pair bus, respectively. The process of packet transmission is broken into two parts. First, the packets are received and then stored in the bridge's internal buffer before being sent to the RF transceiver 22. The bridge bundles Lonworks® packets regardless of packet size. Once ready, the packets are forwarded by way of cable 24 to the RF transceiver 22 where they reside in another buffer until the RF transceiver sees that network communication is possible. The packets are segmented into a size not to exceed 80 bytes. Network readiness is defined as a period of time in which communications are silent from other LonWorks® nodes or devices on the network. Once transmitted over the RF link to remote RF transceivers 22', the packets larger than 80 bytes in total length are reassembled by a remote bridge 25', which is the same as bridge 25. After reassembly, the packets are checked for errors and then forwarded in a reverse manner where they re-enter the native LonWorks® environment on a twist-pair bus 20' of the second domain 10'.

It should be noted that more than one device, node or controller 12 or 12' may be connected over the wire busses to the bridges 25 and 25' and the additional domains may form part of the network. Communication from the remote devices 12' to the devices 12 of domain 10 is in a reverse manner.

Figure 3:
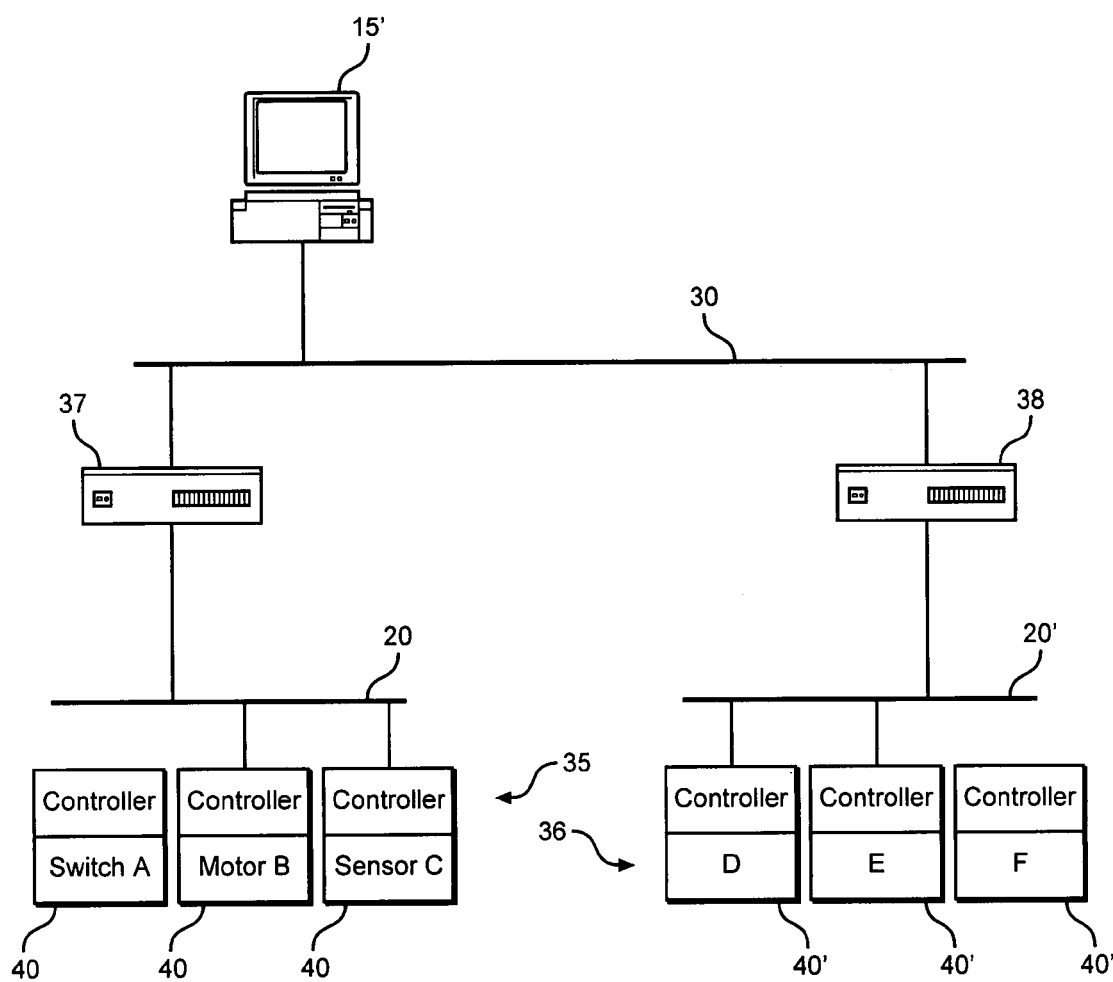
FIG. 3 is a schematic chart showing a remote work station on an Ethernet setup for communicating with the devices and controllers on the LonWorks® busses of domains of a LonWorks® network.

FIG. 3 shows a schematic diagram of a LonWorks® protocol system wherein a remote management computer 15' is connected by way of the Ethernet 30 to two twisted-pair buses 20 and 20' of two domains 35 and 36 of a LonWorks® network by way of routers 37 and 38 such that remote management of the controllers, devices or nodes 40 and 40', similar to those discussed with respect to the embodiment shown in FIGS. 1 and 2, is possible.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

We claim:

1. A method for radio frequency communication between electrically operated devices of at least two domains in a LonWorks® protocol of a management network, the method comprising the steps of:

connecting the at least one first device of the first domain to a first bus of the first domain such that the at least one first device communicates with the first bus in the LonWorks® protocol;

positioning the second domain remotely from the first domain such that communication between the first and second domains must be by radio frequency communication and connecting the at least one second device of the second domain to a second bus of the second domain such that the at least one second device communicates with the second bus in the LonWorks® protocol and such that the second bus is remotely positioned relative to the first bus;

connecting each of the first and second buses to inputs of first and second bridge devices of the first and second domains, respectively, where each bridge device converts LonWorks® protocol received from the respective first and second buses into a different communication protocol at outputs thereof without conversion software;

communicating the different communication protocol from the outputs of the first and second bridge devices to first and second radio frequency transceivers of the first and second domains, respectively;

transmitting the different communication protocols between the first and second radio frequency transceivers of the first and second domains;

communicating received different communication protocols from the first and second transceivers to the first and second bridge devices and converting the received different communication protocols to LonWorks® protocols; and communicating the converted LonWorks® protocols to the at least one first and second devices through the first and second buses, respectively;

wherein at least one device of the first domain is controlled by signals transmitted from at least one controller of the second domain.

2. The method of claim 1 including the step of communicating a LonWorks® management computer device with at least one of the first and second buses and communicating with said at least one first and second devices.

3. The method of claim 2 wherein the step of communicating the LonWorks® management computer includes connecting the at least one of the first and second buses to the Ethernet.

4. The method of claim 1 wherein the different communication protocol is selected from a group of protocols consisting of RS-232, RS-422, RS-485 and Ethernet media.

5. A system for radio frequency communication between electrically operated devices of at least two domains that are remotely spaced relative to one another in a LonWorks® protocol of a management network, the system comprising;

first and second remotely spaced LonWorks® domains, at least one first device connected to a first bus of the first domain and at least one second device of the second domain, connected to a second bus of the second domain, and wherein each of the at least one first and second devices communicates with the first and second buses in a LonWorks® protocol by way of first and second microprocessors associated therewith, respectively, means connecting each of the first and second buses to inputs of first and second bridge devices, respectively, where each bridge device converts LonWorks® protocol into a different communication protocol at outputs thereof without conversion software;

means for communicating the different communication protocol from the outputs of the first and second bridge devices to first and second radio frequency transceivers of the first and second domains, respectively, such that the different communication protocols are transmitted between the first and second radio frequency transceivers;

means for communicating received different communication protocols from the first and second radio frequency transceivers to the first and second bridge devices for converting the received different communication protocols to LonWorks® protocols, and means for communicating the converted LonWorks® protocols to the at least one first and second devices through the first and second buses, respectively;

wherein at least one device of the first domain is controlled by signals transmitted from at least one controller of the second domain.

6. The system of claim 5 wherein said first and second bridge devices are devices that convert LonWorks® to serial protocol.

7. The system of claim 6 wherein the serial protocol is selected from a group of protocols consisting of RS-232, RS-422, RS-485 and Ethernet media.

8. The system of claim 5 wherein the first and second bridge devices are D-LonbridgeRS bridges that are plug and play bridges.

9. The system of claim 8 wherein the first and second transceivers are selected from a group of transceivers operating at frequencies consisting of 900 MHz, 2.4 Ghz, and 5.8 GHz.

10. The system of claim 8 wherein the first and second transceivers are 802.11 transceivers.

11. The system of claim 5 including at least one LonWorks® management computer communicating with at least one of the first and second buses.

* * * * *